United States Patent
Zipples et al.

(10) Patent No.: US 10,093,820 B2
(45) Date of Patent: Oct. 9, 2018

(54) METHOD FOR REDUCING FLUORINATED EMULSIFIERS FROM AQUEOUS FLUOROPOLYMER DISPERSIONS USING SUGAR-BASED EMULSIFIERS

(71) Applicant: 3M INNOVATIVE PROPERTIES COMPANY, St. Paul, MN (US)

(72) Inventors: Tilman C. Zipples, Burghausen (DE); Arne Thaler, Emmerting (DE); Egon Obermaier, Taubenbach (DE); Klaus Hintzer, Kastl (DE); Michael C. Dadalas, Eggenfelden (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 19 days.

(21) Appl. No.: 14/891,566

(22) PCT Filed: May 16, 2014

(86) PCT No.: PCT/US2014/038307
§ 371 (c)(1),
(2) Date: Nov. 16, 2015

(87) PCT Pub. No.: WO2014/186647
PCT Pub. Date: Nov. 20, 2014

(65) Prior Publication Data
US 2016/0122572 A1 May 5, 2016

(30) Foreign Application Priority Data
May 17, 2013 (EP) .................................... 13168169

(51) Int. Cl.
| | |
|---|---|
| C08K 5/07 | (2006.01) |
| C11D 3/37 | (2006.01) |
| C09D 127/18 | (2006.01) |
| C08J 3/03 | (2006.01) |
| C08J 3/05 | (2006.01) |
| C08F 6/16 | (2006.01) |
| C08F 6/20 | (2006.01) |
| C08K 5/06 | (2006.01) |
| C08K 5/41 | (2006.01) |
| C08K 5/42 | (2006.01) |
| C08K 5/521 | (2006.01) |
| C09D 105/00 | (2006.01) |
| C08K 5/053 | (2006.01) |
| C08K 5/1545 | (2006.01) |

(52) U.S. Cl.
CPC .............. C09D 127/18 (2013.01); C08F 6/16 (2013.01); C08F 6/20 (2013.01); C08J 3/03 (2013.01); C08J 3/05 (2013.01); C08K 5/06 (2013.01); C08K 5/41 (2013.01); C08K 5/42 (2013.01); C08K 5/521 (2013.01); C09D 105/00 (2013.01); C08K 5/053 (2013.01); C08K 5/1545 (2013.01)

(58) Field of Classification Search
None
See application file for complete search history.

(56) References Cited

U.S. PATENT DOCUMENTS

| | | | |
|---|---|---|---|
| 3,489,595 | A | 1/1970 | Brown, Jr. |
| 4,391,940 | A | 7/1983 | Kuhls |
| 5,576,381 | A | 11/1996 | Bladel |
| 6,566,452 | B1 | 5/2003 | Bladel |
| 6,613,941 | B1 | 9/2003 | Abdel-Magid |
| 6,833,403 | B1 | 12/2004 | Bladel |
| 2006/0074178 | A1 | 4/2006 | Auyeung |
| 2007/0142541 | A1* | 6/2007 | Hintzer ............... B01F 17/0035 524/544 |
| 2008/0178993 | A1 | 7/2008 | Kelmartin |
| 2016/0130409 | A1 | 5/2016 | Zipplies et al. |

FOREIGN PATENT DOCUMENTS

| | | |
|---|---|---|
| DE | 2714593 | 10/1978 |
| DE | 202004020048 | 3/2005 |
| EP | 0329154 | 8/1989 |
| EP | 969055 | 1/2000 |
| EP | 1016466 | 7/2000 |
| EP | 1452571 | 9/2004 |
| EP | 1533325 | 5/2005 |
| EP | 1574527 | 9/2005 |
| EP | 1676868 | 7/2006 |
| EP | 1963247 | 9/2008 |
| EP | 2284200 | 2/2011 |
| EP | 2548897 | 1/2013 |
| WO | WO 1994-14904 | 7/1994 |
| WO | WO 2000-44576 | 8/2000 |
| WO | WO 2002-078862 | 10/2002 |
| WO | WO 2003-037623 | 5/2003 |
| WO | WO 2003-059992 | 7/2003 |
| WO | WO 2006-086793 | 8/2006 |
| WO | WO 2010-129842 | 11/2010 |
| WO | WO 2011-014715 | 2/2011 |
| WO | WO 2011/014715 A2 * | 2/2011 |

OTHER PUBLICATIONS

Geetha, "Alkyl Poly Glucosides (APGs) Surfactants and Their Properties: A Review", Tenside Surf. Det., 2012, vol. 49, No. 5, pp. 417-427.

Lawrence, Fluorinated Coating and Finishes Handbook: The definitive user guide and databook, Chapter 7 (Additives), Section 7.15, "Coalescent, Coalescent Agent, Film Forming Agent", 2006, pp. 89-97.

International Search Report for PCT International Application No. PCT/US2014/038307 dated Sep. 5, 2014, 4 pages.

* cited by examiner

*Primary Examiner* — Robert T Butcher
(74) *Attorney, Agent, or Firm* — Thomas M. Spielhauer

(57) ABSTRACT

Provided are processes for upconcentrating fluoropolymer dispersions. Also provided are upconcentrated dispersions and substrates coated with such dispersions.

12 Claims, No Drawings

METHOD FOR REDUCING FLUORINATED EMULSIFIERS FROM AQUEOUS FLUOROPOLYMER DISPERSIONS USING SUGAR-BASED EMULSIFIERS

CROSS REFERENCE TO RELATED APPLICATIONS

This application is a national stage filing under 35 U.S.C. 371 of PCT/US2014/038307, filed May 16, 2014, which claims priority to European Application No. 13168169.4, filed May 17, 2013, the disclosure of which is incorporated by reference in its/their entirety herein.

FIELD

The present disclosure relates to methods for purifying fluoropolymer dispersions by reducing their content of fluorinated emulsifiers using sugar-based emulsifiers by upconcentrating fluoropolymer dispersions using sugar-based emulsifiers and to upconcentrated fluoropolymer dispersions containing sugar-based emulsifiers and their applications and including methods for applying them.

BACKGROUND

Fluoropolymers have been long known and have been used in a variety of applications because of several desirable properties such as heat resistance, chemical resistance, weatherability, UV-stability, low friction and anti-stick properties, etc.

Commonly known or commercially employed fluoropolymers include polytetrafluoroethene (PTFE), copolymers of tetrafluoroethene (TFE) and hexafluoropropene (HFP) (such copolymers are also referred to as FEP polymers), copolymers of tetrafluoroethene and perfluoroalkoxy copolymers (such copolymers are also referred to as PFA), copolymers of ethene and tetrafluoroethene (such copolymers are also referred to as ETFE polymers), copolymers of tetrafluoroethene, hexafluoropropene and vinylidene fluoride (VDF) (such copolymers also referred to as THV) and polyvinylidene fluoride polymers (PVDF) and others.

Fluoropolymers have been used to improve the thermal and chemical resistance of a substrate or to provide anti stick or low friction properties to a substrate, for example by coating or impregnating the substrate with the fluoropolymers. The fluoropolymers may be applied to the substrate by liquid coating techniques if they are provided as a liquid formulation, such, as for example, as aqueous dispersions.

Fluoropolymer dispersions can be conveniently produced by aqueous emulsion polymerization employing fluorinated monomers, one or more radical reaction initiators and a suitable emulsifier. Fluorinated alkanoic acids of the type $CF_3$—$(CF_2)_6$—$COO^-$ with n being an integer of 6 to 8, and in particular perfluorooctanoic acid (n=6) and its salts, have been the emulsifier of choice in the aqueous emulsion polymerization of fluoromonomers for the last decades. Recently also other types of fluorinated emulsifiers for example fluorinated polyether acids have been employed. Fluorinated polyether acids may be generally more biodegradable than fluorinated alkanoic acids.

There is a continuous need to improve the properties and processing of fluoropolymer dispersions containing low amounts of the more biodegradable fluorinated polyether emulsifiers.

SUMMARY

Therefore, in the following there is provided a process for upconcentrating fluoropolymer dispersions comprising, providing an aqueous fluoropolymer dispersion containing a fluorinated polyether emulsifier and subjecting that dispersion to a heat treatment in the presence of from about at least 1% by weight, preferably from about 1 to about 15% by weight (based on the fluoropolymer content of that dispersion) of a sugar-based emulsifier to induce phase separation into an aqueous fluoropolymer-enriched dispersion and an aqueous fluoropolymer-depleted phase.

In another aspect there is provided an upconcentrated aqueous fluoropolymer dispersion containing
i) at least 45% by weight based on the dispersions of a fluoropolymer;
ii) at least one sugar-based emulsifier in an amount of from at least about 1% by weight, preferably at least about 1 to 15% by weight based on the fluoropolymer content of the dispersion;
iii) an ester-functionalised coalescent agent and or an anionic surfactant selected from sulfates, sulfonates and phosphonates; wherein the dispersion contains from 0 to 1000 ppm based on the total weight of the dispersion of fluorinated polyether emulsifiers.

In a further aspect there is provided a substrate coated with the upconcentrated dispersion.

DETAILED DESCRIPTION

Before any embodiments of this disclosure are explained in detail, it is to be understood that the disclosure is not limited in its application to the details set forth in the following description. The invention is capable of other embodiments and of being practiced or of being carried out in various ways.

Also, it is to be understood that the phraseology and terminology used herein is for the purpose of description and should not be regarded as limiting. The use of "including," "containing", "comprising," or "having" is meant to be non-limiting and is meant to encompass the items listed thereafter (and equivalents thereof) as well as additional items. The word "consisting" is used to mean the items listed thereafter (and equivalents thereof) but not any additional items. The use of "a" or "an" is meant to encompass "one or more".

Any numerical range recited herein is intended to be an abbreviation and to explicitly include all values from the lower value to the tipper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

Fluoropolymers and Fluoropolymer Dispersions

Fluoropolymer dispersions according to the present disclosure include aqueous dispersions of fluoropolymer particles. Fluoropolymer dispersions resulting from the polymerisation (so called raw dispersions) typically have a polymer content of from 10 to 30% by weight (based on the total weight of the dispersion). The fluoropolymer content of the dispersions may be increased by upconcentration. The solid content of upconcentrated dispersions is typically from greater than about 40% by weight, for example from about 45% by weight and up to about 70% by weight.

Although any fluoropolymer may be used preferred polymers include those that contain at least about 15% or at least about 30% or at least about 51% by mole of TFE. Typical fluoropolymers include tetrafluoroethene (TFE) homopolymers or TFE copolymers with a co-monomer content of up about 20% by weight and preferably up to about 1% by weight. Suitable co-monomers include fully fluorinated, partially fluorinated or non-fluorinated olefinic co-monomers. Examples include but are not limited to fluoroolefins, such as vinylidene fluoride (VDF), hexafluoropropene (HFP), tetrafluoroethene (TFE), 1,2,3,3,3-pentafluoropropene (1-HPFP), 1,1,3,3,3-pentafluoropropene (2-HPFP), chlorotrifluoroethene (CTFE), vinyl fluoride (VF) and combinations thereof.

Further co-monomers include but are not limited to fluorine-containing vinyl ethers and allyl ethers such as perfluoro(alkyl vinyl) ethers, perfluoro (alkoxy vinyl ether), perfluoro (polyoxyalkyl vinyl ether), perfluoro (alkyl allyl ethers), perfluoro (alkyoxy allyl ethers), perfluoro (polyoxyalkyl allyl ethers). In some embodiments the alkyl chain contains from 1 to 10 carbon atoms. Perfluoro(alkyl vinyl) ethers (PAVE) or allyl ether (PAAE) suitable for use as co-monomers include those of the formula:

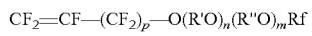

$$CF_2=CF-(CF_2)_p-O(R'O)_n(R''O)_mRf$$

where R' and R'', are different linear or branched perfluoroalkylene groups of 2-6 carbon atoms, m and n are independently 0-6, wherein the sum of n+m may be 0 or at least 1 and Rf is a perfluoroalkyl group of 1-6 carbon atoms and p represents 1 or 0. In some embodiments the number of carbon atoms in the residue (R'O)n(R''O)mRf is not greater than 10 or not greater than 12. Particular embodiments of perfluoro(alkyl vinyl) ethers include perfluoro(methyl vinyl) ether (PMVE) and perfluoro(propyl vinyl) ethers (PPVE).

The fluoropolymers may also contain units or repeating units derived from non-fluorinated or partially fluorinated co-monomers. Non-fluorinated co-monomers include alpha-olefins, for example ethene and propene.

Partially fluorinated co-monomers include but are not limited to vinylfluoride or vinylidenefluoride.

Combinations of any of the above named fluoromonomers and combinations of above named fluoromonomers and hydrocarbon olefins can also be used.

Particular useful are fluoropolymers that are non-melt-processable. Non-meltprocessable fluoropolymers have an MFI (372/5) of 0.1 g/10 min or less. TFE homopolymers and TFE copolymers with a co-monomer content of up to 1% by weight are typically non-melt processable. Typically, the fluoropolymers have a high molecular weight. PTFE polymers with a high molecular weight are also referred to as PTFE fine powder. The molecular weight may be determined via the standard specific gravity (SSG) according to ASTM-D-4895. Surfactants, if present may be removed by the extraction procedure of ASTM D-4441 prior to measuring the SSG. In some embodiments, typical fluoropolymers, in particular non-melt processable fluoropolymers, may have an SSG of from about 2.150 to about 2.200.

The fluoropolymer dispersions may be obtained by aqueous emulsion polymerization using a radical initiator as described, for example, in EP 0 030 663 A2 to Kuhls et al, WO 03/059992 to Cavanaugh et al, or EP 1 533 325 A1 to Zipplies et al., incorporated herein by reference. The aqueous emulsion polymerization is typically carried out in the presence of a fluorinated emulsifier, such a perfluorinated alkanoic acids. Preferably the polymerization is carried out in the presence of fluorinated polyether acids, which may be linear or branched. The fluorinated polyether acids may be perfluorinated or partially fluorinated. Typical examples include fluorinated polyethers according to the general formula:

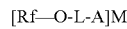

$$[Rf-O-L-A]M$$

with L being a fully fluorinated (perfluorinated) or partially fluorinated alkylene group, Rf being a partially or fully fluorinated alkyl group wherein the alkyl chain is interrupted by at least one catenary oxygen (ether) atoms. A represent an acid residue, like for example carboxylate, sulfonate, sulfate, sulfinate, phosphate or phosphonate group. M represents a cation, typically a metal cation or a hydrogen cation (proton) or a combination thereof, as the counterion(s) for the acid group.

L and Rf may be branched or linear, independently from each other and preferably, L is linear. The anion part of the emulsifiers, i.e. the [Rf—O-L-A]part of the emulsifiers preferably has a molecular weight of less than 5,000 g/mole, more preferably less than 1,500 g/mole. Typically the anion part contains at least 3 or at least 5 carbon atoms.

Examples of suitable fluorinated polyether emulsifiers include those described in EP 1963247 to Hintzer et al, which is incorporated herein by reference.

The fluoropolymers may be of a core-shell structure but a core shell structure may not be necessary. The fluoropolymer particles may be modified to contain polar groups on their surface.

The fluoropolymers are typically present in the dispersion in the form of particles. The particles may be rod-shaped but are typically of spherical shape. In some embodiments the fluoropolymer particles have an average particle size of not more than 600 nm or less than 350 nm, or even less than 250 nm or up to about 199 nm. For example, the fluoropolymers may have an average particle size of from about 20 nm to up to about 198 nm, or from about 51 nm up to about 182 nm or they may have an average particle size of from about 55 nm to less than about 300 nm, or even up to less than about 250 nm or even up to less than about 200 nm. The average particle sizes of the fluoropolymers in the dispersions is typically determined by dynamic light scattering and expressed as Z-average. If not indicated otherwise, the average particle size as used herein is the Z-average.

The dispersions may contain fluoropolymer populations of different particle sizes, i.e. the particle size distribution of the fluoropolymer particles can be bimodal or multi-modal as disclosed in e.g. U.S. Pat. No. 5,576,381, EP 0 990 009 B1 and EP 969 055 A1. Multi-modal fluoropolymer particle dispersions may present advantageous properties in coatings, such as better adhesion to the substrate and denser film formation. For example, the fluoropolymer dispersions may comprise a mixture of first fluoropolymer particles having an average particle size (Z-average) of at least 180 nm in combination with second fluoropolymer particles that have an average particle size (Z-average particle diameter) of less than 180 nm, preferably an average particle size of not more than 0.9 or not more than 0.7 times the average particle size (Z-average) of the first fluoropolymer particles (as disclosed, for example, in U.S. Pat. No. 5,576,381). Bimodal or multi-modal fluoropolymer dispersions can be conveniently obtained by blending the aqueous fluoropolymer dispersion of different fluoropolymer particle sizes together in the desired amounts. The fluoropolymer population may not only be bimodal or multimodal with respect to the particle sizes or molecular weights of the same fluoropolymers but may also be bimodal or multimodal with respect to the fluoropolymer types used. For example the first polymer having an average particle size of at least 180 nm may be a non-meltprocessable fluoropolymer and the second fluoropolymer having an average particles size that is not more than 0.9 or not more than 0.7 times the average particle size of the first polymer may be a non-melt processable or a melt-processable fluoropolymer. Similarly the first and/or second fluoropolymer may be a fluoroelastomer. In particular, dispersions of non-melt processable fluoropolymers may be mixed with aqueous dispersions of other fluoropolymers, in particular melt-processable fluoropolymers. Suitable dispersion of melt-processable fluoropolymers that can be mixed with the non-melt processable fluoropolymer dispersions include dispersions of the following fluoropolymers: copolymers comprising TFE and a perfluorinated vinyl ether (PFA) and copolymers comprising TFE and HFP (FEP). Such dispersions may be monomodal, bi-modal or multimodal as disclosed in e.g. European patent application No. EP 990 009 A1.

Fluoropolymer dispersions obtained from the polymerization (e.g. raw dispersions) may be subjected to the upconcentration process may have low fluoropolymer contents and may have to be upconcentrated. Also ion-exchanged dispersions (i.e. dispersions with reduced amounts of fluorinated emulsifiers) may be subjected to the upconcentration process to increase their fluoropolymer contents. The ion-exchange process is typically carried out to remove the amount of fluorinated emulsifiers from the fluoropolymer dispersions. Methods of removing the emulsifiers from the dispersions by anion-exchange and addition of non-ionic emulsifiers are disclosed for example in EP 1 155 055 B1, EP 1 193 242 B1 or WO 2006/086793.

Fluoropolymer dispersions can be conveniently upconcentrated by thermal decantation in the presence of the sugar-based emulsifiers described herein. According to the present disclosure sugar-based emulsifiers as provided herein may be added as stabilizers and the upconcentration process is carried out in the presence of the sugar-based emulsifiers. An advantage of the present disclosure is that upconcentration of dispersions containing fluorinated polyether emulsifiers as described herein in the presence of sugar-based emulsifiers leads to an improved enrichment of the aqueous polymer-depleted phase with the fluorinated emulsifiers. In other words, the use of sugar-based emulsifiers efficiently purifies the dispersions from fluorinated emulsifiers. This may be sufficient to remove the fluorinated emulsifiers from the dispersions and may avoid the use of ion-exchange treatment. Alternatively, when using the upconcentration process provided herein, shorter ion-exchange columns may be used to come to a desired reduction in fluorinated emulsifiers.

Another advantage of using the sugar-based emulsifiers as stabilizers in the thermal upconcentration is that they accelerate and improve phase separation compared to other non-ionic emulsifiers. This way the upconcentration process by thermal decantation can be run faster and more economically.

Upconcentration by thermal decantation typically proceeds by adding stabilizing emulsifiers in amounts effective to stabilize the dispersions. Typical amounts include from 3 to 15% by weight of sugar-based emulsifier based on the fluoropolymer content of the dispersion, for example about 4.0% to about 8.0%. The dispersions are then subjected to a mild heat treatment that avoids conditions at which coagulation may occur, for example strong shear forces and high temperatures. A typical upconcentration process as known in the art is described, for example, in EP1574527A1. Typically, allowing the dispersions to stand on a heating plate set to 60 to 80° C. for one hour may be sufficient to induce phase separation but the dispersions may also allowed to stand at these temperatures over night (e.g. about 24 hours). The dispersions may then be allowed to reach room temperature to separate the phases. The dispersions separate into a fluoropolymer rich aqueous phase and into a fluoropolymer-depleted phase. The fluoropolymer-depleted phase may be discarded or subjected to recycling to retain the fluorinated emulsifier.

The resulting upconcentrated dispersions contain the fluoropolymers as described above in an amount of from at least 40% by weight and preferably between 45 and 65% by weight based on the weight of the dispersion. They typically contain the sugar-based emulsifiers in an amount of at least 0.5% by weight, preferably at least about 1% by weight and more preferably from 1 to 15 by weight, most preferably between 3 and 10% by weight based on the fluoropolymer content.

In typical embodiments the upconcentrated dispersions are free of fluorinated surfactant or contain only a reduced amount thereof, such as for example amounts up to about 500 ppm of fluorinated emulsifiers, preferably fluorinated polyether emulsifiers. In some embodiments the amount of fluorinated emulsifiers, preferably fluorinated polyether emulsifiers, is from about 5 to about 200 ppm or from about 10 to about 100 ppm (based on the total weight of the dispersion).

In preferred embodiments the fluoropolymer dispersions are ion-exchanged dispersions, for example dispersion subjected to an anion-exchange process to remove fluorinated emulsifiers or other compounds from the dispersions. Such dispersions may contain, in addition to the sugar-based emulsifiers, non-ionic emulsifiers of the type as described in EP 1 155 055 B1, EP 1 193 242 B1 or WO2006/086793, which are referred to herein as non-ionic non sugar-based emulsifiers. Particular examples of non-ionic non sugar-based emulsifiers include but are not limited to those corresponding to the general formula:

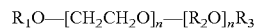

wherein R1 represents a linear or branched aliphatic or aromatic hydrocarbon group having at least 8 carbon atoms, preferably 8 to 18 carbon atoms, which may contain one or more hydroxy groups. In some embodiments the residue R1 corresponds to a residue (R')(R")C— wherein R' and R" are the same or different, linear, branched or cyclic alkyl groups. R2 represents hydrogen or a C1-C3 alkylene unit, n has a value of 0 to 40, m has a value of 0 to 40 and the sum of n+m is at least 2. $R_3$ represents H. When the above general formula represents a mixture, n and m will represent the average amount of the respective groups. Also, when the above formula represents a mixture, the indicated amount of carbon atoms in the aliphatic group R1 may be an average number representing the average length of the hydrocarbon group in the surfactant mixture. Another example of suitable non-ionic surfactants include but are not limited to ethoxylated aromatic compounds.

Suitable commercially available non-ionic surfactant or mixtures of non-ionic surfactants include those available from Clariant GmbH under the trade designation GENAPOL such as GENAPOL X-080 and GENAPOL PF 40. Further suitable non-ionic surfactants that are commercially available include those of the trade designation TERGITOL TMN 6, TERGITOL TMN 100X, TERGITOL TMN 10, TRITON X-80 and TRITON X-100 (available from Dow Chemical). Ethoxylated amines and amine oxides may also be used as non-ionic surfactants.

It is an advantage of the present disclosure that the sugar-based emulsifiers provided herein can be added to the fluoropolymer dispersions before or during the anion-exchange and can either replace the nonionic non-sugar based emulsifiers surfactants described above or supplement them. Therefore, the upconcentrated dispersions may be free or essentially free of non-ionic surfactants other than the sugar-based emulsifiers described herein. "Essentially free" means containing them in an amount of less than 1% by weight based on the total dispersion.

In an embodiment of the present disclosure, the upconcentrated dispersions are to be used as coating or impregnating compositions. In such embodiments, the dispersions include additives as described below. Anionic surfactants as described below may be added to the dispersions to further increase their shear stability.

Anionic surfactants, as well as other ions, may be added to adapt the conductivity of the upconcentrated dispersions to the desired levels, as may be needed for coating or impregnating the respective substrates. In some embodiments the dispersions have a conductivity of at least 50 µS or at least 1,000 µS, for example, but not limited to between about 100 µS and 1500 µS. The desired level of conductivity of the dispersions may be adjusted by adding a salt thereto such as for example a simple inorganic salt, for example sodium chloride or ammonium chloride, or, for example, ionic surfactants.

In some embodiments the upconcentrated dispersions may have a viscosity of less than about 150 mPa·s at 23+/−3° C., for example between about 20 and about 140 or between about 20 and about 95 mPa·s at 23+/−3° C. Typically, the viscosity is still less than about 100 mPa·s at 40° C. The viscosity can be determined as described in EP 1 452 571 B1, incorporated herein by reference. Dispersions having a VTT (viscosity temperature transition) of less than 40° C. may be prepared. The VTT can be determined as described in EP 1 452 571 B1 incorporated herein by reference.

Coatings made from the dispersions may have a critical film thickness (CCT) of at least 10 µm. The CCT may be determined as described, for example, in EP 1 452 571 B1 incorporated herein by reference.

Sugar-based Emulsifiers

The sugar-based emulsifiers are typically based on sugars that have been modified to contain at least one long chain unit. The sugar-based emulsifiers are preferably non-ionic and non-fluorinated. The sugar-based emulsifiers are aliphatic, i.e. they are non-aromatic, aliphatic polyols containing at least one polyol unit linked to at least one long chain unit.

The long chain unit is acyclic and may be linear or branched. In a typical embodiment the long chain unit contains from 6 to 26 carbon atoms, for example from 8 to 22 or from 10 to 16 carbon atoms. The chain may be interrupted by one or more than one catenary heteroatoms, including O (oxygen) and N (nitrogen) atoms, but preferably catenary oxygen atoms to form an ether or polyether residue. The long chain unit typically comprises an alkyl or alkenyl chain, which may, optionally, contain one or more catenary heteroatoms, preferably oxygen atoms and may, optionally, contain substituents including alkoxy or polyoxyalkyl substitutents. The long chain unit may be attached to the polyol unit directly of via a linking group. Examples of linking groups include but are not limited to ester groups, amide groups and combinations thereof.

The polyol unit preferably comprises a six-membered ring and at least two or at least three hydroxyl groups directly bonded to the ring. Preferably two, more preferably at least two hydroxyl groups are adjacent to each other. Typically, the six-membered ring is a pyranose unit, i.e. a six-membered ring of five carbon ring atoms and one oxygen ring atom.

The sugar-based emulsifier is typically a sugar that has been modified to contain the long chain unit and the sugar forms the polyol unit of the sugar-based emulsifier. In some embodiments the sugars have been modified in that one or more of the hydrogen atoms of a hydroxy group bound to the carbon ring atom of the sugar has been substituted by the long chain residue such that an ether, ester or amide bond is created between the long chain residue and the sugar moiety.

The sugar-based emulsifiers may comprise more than one polyol unit, which units may be identical or different. The polyol typically comprises a six-membered ring, typically a pyranose ring (a six-membered ring of five carbon atoms and one oxygen atom). Suitable sugar based emulsifiers include but are not limited to alkyl glycosides (which include monoglycosides and polyglycosides) and alkenyl glycosides. The alkyl or alkenyl residues may be modified to contain catenary oxygens or other heteroatoms and may contain substituents as described above for alkyl and alkenly residues. Examples for the sugar parts of the glycosides include, but are not limited to monosaccharides and polysaccharides. Monosaccharides include pentoses and hexoses. Typical examples of monosaccharides include ribose, glucose, galactose, mannose, fructose, arabinose, xylose. Polyglycosides include oligomers containing from 2 to 10, preferably 2 to 4 sugar units of the same or different monosaccharides and include oligosaccharides including but not limited to saccharose, maltose, lactose, raffinose and isomaltose.

In a typical embodiment the cyclic polyol unit to which the long chain unit is attached contains a six-membered ring of 5 carbon and one hetero atom as described above, preferably, an oxygen atom. In a typical embodiment the polyol unit further contains at least two or at least three adjacent hydroxy groups (—OH groups) bound to the carbon ring atoms. The sugar-based emulsifiers may contain a single cyclic polyol (sugar) unit or multiple cyclic polyol (sugar) units.

Specific examples of sugar-based emulsifiers include but are not limited to alkyl glucosides and poly alkyl glucosides. Alkyl glucosides include monoglucosides (i.e. a molecule with a single glucose moiety) diglucosides (i.e. a molecule with two glucose moieties) and poly glucosides (i.e. molecules with two or more glucose moieties and typically up to 4 or even up to 10 glucose units).

The glycosides may contain only glucose units but may also contain units of other sugars. The sugar moiety may be present as a pyranose (six-membered ring) or as combinations of pyranoses or pyranose and furanoses (five membered ring of four carbon ring atoms and one oxygen ring atom) and mixtures thereof (for example, but not limited to glucopyranosides, glucofuranosides, di-glucopyranosides, di-furanosides, glucopyranoside-glucofuranosides and the like). Preferably, the glycosides are alkyl glucosides or alkenyl glucosides. The alkyl glucosides (and alkenyl glucosides) may contain a single, multiple, identical and different alkyl or alkenyl residues as long chain units as described above. The alkyl and alkenyl residues include linear or branched, acyclic residues containing at least 6 carbons, preferably at least 8 carbon atoms. In a typical embodiment the alkyl or alkenyl chain contains from 6 to 26, or from 8 to 16 carbon atoms. The alkyl and alkenyl chains may be substituted, wherein the substituents include, for example, halogens (other than fluorides) or catenary oxygen atoms, e.g. the long chain moiety may be a (poly)oxy alkyl or alkenly residue. The alkyl and alkenyl chains are preferably not substituted.

According to a specific embodiment of the present disclosure the sugar-based emulsifiers are present as a blend of sugar-based emulsifiers. The blend may contain sugar-based emulsifiers having different chain lengths, i.e. the sugar-based emulsifiers are at least bimodal compositions having populations of different chain length. For example, the first population may contain chains having from 6 to 10 carbon atoms and the second population contains chains from 10 to 18 carbon atoms. Such multimodal composition can be prepared by blending the appropriate sugar-based emulsifiers. Examples of blends include blends containing from about 20 to 50% by weight of a population a), which is the population containing sugar-based emulsifiers with chain length from 6 to 10 carbon atoms and from 20 to 50% by weight of a population b), which is the population containing sugar-based emulsifiers with chain length from 10 to 18 carbon atoms. Sugar-based emulsifiers are commercially available. The synthesis of sugar-based emulsifiers is described for example, in D. Geetha and R. Tyagi, Tenside Surf. Det. 49 (2012) 5, pages 417 to 427.

Anionic Surfactants

The dispersion according to the present disclosure may further contain anionic non-fluorinated surfactants. Anionic surfactants may be added, for example, to fine tune the viscosity or other properties of the dispersion or to improve interaction with substrates. It has been found that anionic surfactants selected from sulfonates, sulfates and phosphonates may further increase the shear stability of the dispersions according to the present disclosure, in particular in the presence of coating additives, like for example coalescent agents. Suitable anionic surfactants may contain one or more sulfonate, sulfate or phosphonate groups or combinations thereof and a hydrocarbon aliphatic moiety that may be substituted by catenary oxygen atoms or that is not substituted. The hydrocarbon moiety may be saturated or unsaturated and may contain one, two or three carbon-carbon double bonds.

Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched. Particular examples of non fluorinated, anionic hydrocarbon surfactants for use in this invention include alkyl sulfonates such as lauryl sulfonate, alkyl sulfates such as lauryl sulfate, fatty acid sulfates or sulfonates (meaning molecules where the carboxylate group has been replaced by the sulfate, sulfonate or phosponate unit) and salts thereof. Fatty acids typically have from about 6 to 26 carbon atoms. They include, for example, oleic acid, stearic acid arachidic acid, arachidonic, linoleic acid, linolenic, erucic, and palmitic acid, Examples anionic surfactants include commercially available materials like available under the trade designation HOSTAPUR SAS 30 (secondary alkyl sulphonate sodium salt), HOSTAPUR OS (oleinsulfonate), EMULSOGEN LS (sodium lauryl sulfate) and EMULSOGEN EPA 1954 (mixture of C2 to C4 sodium alkyl sulfates) each available from Clariant GmbH, Germany; TRITON X-200 (sodium alkylsulfonate) available from Dow Chemical Industries.

The anionic surfactants may be typically present in an amount of from about 0.01 to about 15% by weight or from 0.05 to about 1.5% by weight based on the total weight of the dispersion Coating Additives and Coating Dispersions The fluoropolymer dispersions, in particular when used as coating compositions, may further contain ingredients that may be beneficial when coating or impregnating the dispersion on a substrate, such as adhesion promoters, friction reducing agents, pigments and the like. A particular example includes coalescent agents. Coalescent agents are typically slowly evaporating compounds leading to the formation of more homogeneous films, as can be determined by visible inspection. Examples include but are not limited to glycerol, propylene glycols and ether and esters thereof, ethylene glycols and ether or esters thereof and butyrolactones see for example Lawrence W. McKeen, "Fluorinated Coating and Finishes Handbook: The definitive user guide, chapter 7.15. "Coalescent, Coalescent Agent, Film Forming Agent", 2006, William Andrews Publishing, Norwich, N.Y., USA."

However, the addition of coalescent agents may reduce the shear stability of the dispersions. It has been found by the present inventors that when using hydrocarbon esters as coalescent agents the shear stability of the dispersions can be maintained or their reduction in shear stability can be limited to acceptable levels. Suitable hydrocarbon esters include but are not limited to linear, branched or cyclic hydrocarbon esters, wherein the hydrocarbon esters may contain one or more oxygen atoms for example as catenary ether group(s), or as substituents for examples as carbonyl residues, ether or polyether residues s), or hydroxyl group(s) or combinations thereof. For example the hydrocarbon esters include but are not limited to hydroxy esters and polyether esters or hydroxyl polyether esters. The hydrocarbon esters typically have a boiling point of from about 100° C. to about 270° C., preferably from about 180° C. to about 250° C. Typical examples of suitable hydrocarbon esters include esters of alkyl carboxylic acid and alkanols. The alkyl acids include but are not limited to linear or branched C3 to C10 acids. The alkanols, include but are not limited to linear or branched alkanediols or polyols and ether or polyether alcohols. The esters may be monoesters or polyester. Examples of commercially available hydrocarbon ester coalescent agents include but are not limited to UCAR FILMER IBT (2,2,4,-trimethyl-1,3-pentnediol monoisobutyrate) and butyl CARBITOL acetate (diethylene glycol butyl ether acetate) both available from The Dow Chemical Company, midland Michigan, USA. Typical amounts of coalescent agents may be 0.5 to 20% by weight based on the weight of the dispersion and are usually the amounts recommended by the suppliers of the coalescent agents. Generally, the fluoropolymer dispersions may be blended with the hydrocarbon esters and also with further components typically used to produce a final coating composition. The additives may be dissolved or dispersed in an organic solvent such as toluene, xylene and the like are added directly.

Typical components that may be used in a final coating composition include polymers such as polyamide imides, polyimides or polyarylen sulphides. Particular examples include polyethersulfons, polysulfons and polyphenylsulfons, including but not limited to those commercially available from BASF, Ludwigshafen, Germany, under the trade designation ULTRASON E, ULTRASON S and ULTRASON P. Other additives include, for example, inorganic carbides, such as silicon carbide, and metal oxides. They are typically employed as heat resistant adhesion promoters or primers. Still further ingredients such as pigments and mica particles may be added as well to obtain the final coating composition. The fluoropolymer dispersions typically represent about 10 to 80% by weight of the final composition. Details on coating compositions for metal coatings and components used therein have been described in the art, including but not limited to WO 02/78862, WO 94/14904, EP 1 016 466 A1, DE 2 714 593 A1, EP 0 329 154 A1, WO 00/44576, and U.S. Pat. No. 3,489,595. The fluoropolymer compositions provided herein may be used to prepare fluoropolymer coated sheets, fluoropolymer coated cookware or fluoropolymer coated beads, such as chromatographic resins, fluoropolymer containing textiles, garments, outdoor clothing, fluoropolymer layer(s) containing fabrics for use in architecture, tents, and the like. Illustrative examples of such articles and methods of preparing them are described in DE 20 2004 020 048 U1, WO 03/037623 and U.S. Patent Publ. No. 2008/0178993.

The dispersions provided herein are particular suitable for continuous coating processes or for coating applications using pumps and/or spray nozzles, i.e. the dispersions are suitable for spray coating.

The fluoropolymer dispersions described herein may be used, for example, to laminate, coat and/or impregnate a substrate or a surface. The surface may be an inorganic or organic material. The substrate may be, for example, a fiber, a fabric, a granule or a layer. Suitable substrates include, but are not limited to, fibers, fabrics, granules and layers. Typically, the substrates include fibers, fabrics, granules and layers containing one or more organic polymers, including, for example, fluoropolymers. The fabrics may be woven or non-woven fabrics. The fibers may be organic or inorganic. Preferably the substrates are metal or coated metals.

Advantages and embodiments of this invention are further illustrated by the following exemplified embodiments and examples which should not be construed to limit the invention thereto.

Methods

The polymer content was determined as solid content gravimetrically according to ISO 12086. Melt flow index (MFI) can be determined according to DIN EN ISO 1 133. Particle sizes can be determined via inelastic light scattering using a Malvern HAS Zetasizer according to ISO 13321. The average particle sizes are expressed as the Z-average. The Z-average can be calculated as $$D_z = \frac{\sum D_i^6}{\sum D_i^5}$$

Melting points can be determined by differential scanning calorimetry (DSC) according to ASTM D 4591.

The content of fluorinated acids can be determined via gas chromatography of the methyl ester using an internal standard, e.g. the methyl ester of perfluoro decanoic acid. To quantitatively convert the acid to the methyl ester, 200 µl dispersion are treated with 2 ml methanol and 1 ml acetylchloride in presence of 0.3 g $MgSO_4$ for 1 hour at 100° C. The formed methyl ester can be extracted with 2 ml hexane and subjected to gas chromatography analysis. Conductivity can be measured with the 712 Conductometer, supplied by Metrohm AG, Germany.

Surface tension can be measured with the Krlss Tensiometer T9, supplied by Krüss GmbH, Germany, for example by the Wilhelmy method using a platinum plate.

EXAMPLES

Examples 1 and 2 (Shear Stability)

PTFE dispersions were prepared according to EP 1 533 325 A1 but using a fluorinated polyether emulsifier rather than perfluorinated octanoic acid. The resulting dispersion was subjected to anion exchange according to EP 1 155 055 B1. Prior to anion exchange different sugar-based emulsifiers were added to the dispersions (5% weight based on the weight of the dispersion). Example 1 contained DISPONIL APG 215. DISPONIL APG 215 contained predominantly alkylpolyglycosides with C8 to C10 carbon chains. Example 2 contained TRITON CG 650. TRITON CG650 contained a blend of a first population of alkyl polyglycosides with C8 to C10 chains and a second population of alkyl polyglycosides with C10 to C16 chains. The resulting dispersions were upconcentrated to a solid content of 58% by evaporation and then subjected to a shear stability test as follows:

150 g of the dispersions were thermostated at 20° C. and put in a 250 ml standard glass beaker of an inner diameter of 65 mm. The agitation head (S 25 N-25 G) of an Ultra Turrax T25, supplied by Janke & Kunkel, was immersed in the center of the beaker such that the end of the head was 7 mm above the beaker bottom. The Ultra Turrax was switched on at a revolution speed of 8000 rpm. Agitation rendered the surface of the dispersion "turbulent" or "wavy". After 10 to 20 sec, 2.0 g xylene were added dropwise within less than 10 sec to the agitated dispersion. Time measurement started with the addition of xylene and was stopped when the surface of the agitated dispersion no longer showed visible turbulence. The surface "freezes" or smoothes due to coagulation. Coagulation was accompanied by a characteristic change of sound of the Ultra Turrax. In case that the "surface freezing" could not be clearly observed due to foam formation the time measurement was stopped with the onset of the change of sound. Reported shear stability values are the average of 5 measurements.

Example 1 coagulated after about 20 minutes while the dispersion of Reference Example 2 did not coagulate after 60 minutes.

Examples 3 to 7 (Shear Stability in Presence of Coalescent Agents and Anionic Emulsifiers)

To 135 g of a dispersion according to examples 1 and 2 15 g of a coalescent agent (BUTYLCARBITOL) were added and 1.0% by weight based on the weight of the dispersion of different anionic surfactants. The dispersions were subjected to a shear stability test as described above. The shear stabilities generally decreased due to the presence of the coalescent agent. However, the shear stability could be improved by adding anionic surfactants.

Examples 3: HOSTAPUR OS (oleic sulfonate, from Clariant), coagulation after 1 minute and 22 seconds.

Example 4: HOSTAPHAT 1306 (phosphoric acid ester, from Clariant), coagulation after 40 seconds.

Example 5: ARKOMON SO (oleolyl sarkosin from Clariant), coagulation after 39 seconds Example 6: EMULSOGEN PF 20S (polymerisation product of PO and EO, from Clariant), coagulation after 33 seconds.

Example 7: EMULSOGEN EPA 1954 (alkyl sulfate sodium salt from Clariant), coagulation after 1 minute and 42 seconds.

Examples 8 to 10 (Shear Stability of Dispersion in Presence of Different Coalescent Agents)

A PTFE dispersion was prepared according to Examples 1 and 2 above. 11% by weight based on the weight of different coalescent agents were added to the dispersions. In Example 8 the coalescent agent was BUTYLCARBITOL ($C_4H_9(OCH_2CH_2)_2OH$), in Example 9 the coalescent agent was BUTYLCARBITOL ACETATE ($C_4H_9(OCH_2CH_2)_2OC(O)C_2H_5$), and in Example 10 the coalescent agent was UCAR FILMER IBT (($CH_3)_2CHCH(OH)C(CH_3)_2CH_2OC(O)CH(CH_3)_2$). All coalescent agents were obtained from The Dow Chemical Company. The dispersions were subjected to the shear stability test described above for Examples 1 and 2.

Example 8 had a shear stability of 35 seconds. Example 9 had a shear stability of 1 minute and 06 seconds. Example 10 had a shear stability of 2 minutes and 25 seconds.

Examples 11 and 12

Acceleration of Phase Separation

PTFE dispersions were prepared according to examples 1 and 2 but were not subjected to anion exchange treatment. The dispersions contained 1,300 ppm of fluorinated polyether surfactant.

Different emulsifiers were added in same amounts (5% by weight) to these dispersions: in example 11 an alcohol ethoxylate (GENAPOL X089) was added. In example 12 a sugar-based emulsifier (TRITON CG 650) was added. Both dispersions were placed in a container covered with a piece of aluminum foil and put on a heating plate without stirring at 75° C. for 24 hours. After 2 hours phase separation occurred in both samples but phase separation had progressed more in example 12 than in example 11. After 7 hours phase separation in example 12 was complete with a clear supernatant, while the supernatant in example 11 was still turbid and phase separation was not complete.

The fluoropolymer enriched and fluoropolymer depleted phase were analyzed for emulsifier content by converting the emulsifier into its methyl ester by treating the dispersion sample with methanol and sulfuric acid and detecting the methyl ester with gas chromatography. The methyl ester of perflorinated dodecanoic acid was used as internal standard. In example 12, the fluoropolymer enriched phase contained about 500 ppm fluorinated emulsifier and the supernatant contained about 800 ppm of fluorinated emulsifiers. In example 11 the distribution was reversed: the fluoropolymer enriched phase contained with 800 ppm fluorinated emulsifier. This shows that the sugar-based emulsifiers promote an enrichment of fluorinated emulsifiers in the aqueous fluoropolymer-depleted phase further reducing the amount of fluorinated emulsifiers in concentrated fluoropolymer dispersions.

List Of Exemplary Embodiments

The following list of embodiments is provided to further illustrate the present disclosure and is not meant to limit the present disclosure to the specific embodiments listed below.
1. Process for upconcentrating fluoropolymer dispersions comprising, providing an aqueous fluoropolymer dispersion containing a fluorinated polyether emulsifier and subjecting that dispersion to a heat treatment in the presence of from at least about 1% by weight, preferably about 1 to about 15% by weight (based on the fluoropolymer content of that dispersion) of a sugar-based emulsifier to induce phase separation into an aqueous fluoropolymer enriched dispersion and an aqueous fluoropolymer-depleted phase.
2. The process according to embodiment 1 wherein the sugar-based emulsifier comprises a cyclic polyol unit and a linear or branched acyclic long chain unit containing from 6 to 26 carbon atoms.
3. The process according to embodiments 1 or 2 wherein the sugar-based emulsifier comprises a cyclic polyol unit having a six-membered ring.
4. The process according to any one of the preceding embodiments wherein the sugar-based emulsifier comprises a pyranose unit (i.e., a six-membered ring of five carbon atoms and one oxygen atom) and at least one linear or branched acyclic chain having from 8 to 16 carbon atoms as long chain unit.
5. The process according to any one of the preceding embodiments wherein the sugar-based emulsifier comprises an alkyl glycoside or alkenyl glycoside wherein the glycoside comprises at least one pyranose unit (i.e., a six-membered ring of five carbon atoms and one oxygen atom) and at least one linear or branched acyclic alkyl or alkenyl chain having from 8 to 16 carbon atoms, wherein the chain may be interrupted by one or more than one ether atoms to form an ether or polyether residue.
6. The composition according to any one of the preceding embodiments wherein the sugar-based emulsifier comprises a blend of different sugar-based emulsifiers comprising
   a) a first population of sugar-based emulsifiers comprising sugar-based emulsifiers wherein the sugar has been modified to contain a linear or branched chain containing from 8 to 10 carbon atoms as long chain unit and
   b) a second population of sugar-based emulsifiers, comprising sugar-based emulsifiers wherein the sugar has been modified to contain a linear or branched chain having from 10 to 16 carbon atoms, and wherein the sugar-based emulsifiers may be otherwise identical or different.
7. The process according to any one of the preceding embodiments wherein the sugar-based emulsifier is an alkyl glycoside or a blend of alkyl glycosides.
8. The process according to any one of the preceding embodiments wherein the heat treatment comprises heating to a temperature of 50 to 80° C. for about one hour.
9. The process according to any one of the preceding claims wherein the fluoropolymer has an average particle size (Z-average) of from about 20 to about 500 nm.
10. The process according to any one of the preceding embodiments wherein the fluoropolymer has a melt flow index of less than 0.1 g/10 min at 372° C. and a load of 10 kg.
11. The process according to any one of the preceding embodiments wherein the fluoropolymer is a TFE copolymer, wherein the comonomer is selected from perfluorinated alkyl vinyl ether and/or perfluorinated alkyl allyl ethers, wherein the alkyl group may contain one or more oxygen atoms and contains up to 10 carbon atoms.
12. The process according to any one of the preceding embodiments wherein the fluoropolymer dispersion contains a fluorinated polyether surfactant having the general formula:

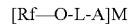
[Rf—O-L-A]M with L being a fully fluorinated (perfluorinated) or partially fluorinated alkylene group, Rf being a partially or fully fluorinated alkyl group wherein the alkyl chain is interrupted by at least one catenary oxygen (ether) atoms, A represent an acid residue and M represents the counterion or combination of counterions for the acid group A and wherein, preferably, the anion part of the emulsifier, represented by [Rf—O-L-A] has a molecular weight of less than 5,000 g/mole, more preferably less than 1,500 g/mole.
13. The process according to any one of the preceding embodiments wherein the process is a process to upconcentrate fluoropolymer dispersions to a fluoropolymer content of at least about 45% by weight.
14. The process according to any one of the preceding embodiments further comprising separating the fluoropolymer-enriched phase from the fluoropolymer depleted phase and adding an anionic surfactant and/or an ester group containing coalescent agent, wherein the anionic surfactant is selected from sulfates, sulfonates and phosphonates.

15. An upconcentrated aqueous fluoropolymer dispersion containing
   i) at least 45% by weight based on the dispersions of a fluoropolymer;
   ii) at least about 1%, preferably from about 1 to about 15% by weight (based on the fluoropolymer) content of a sugar-based emulsifier as defined in any one of embodiments 1 to 6;
   iii) an ester-functionalized coalescent agent and or an anionic surfactant selected from sulfates, sulfonates and phosphonates; wherein the dispersion contains from 0 to 1000 ppm, preferably 5 to 500 ppm of fluorinated polyether emulsifiers based on the total weight of the dispersion.

16. The dispersion according to embodiment 15 wherein the coalescent agent is selected from hydrocarbon esters that may be substituted by oxygen containing substituents, selected from hydroxyl groups, carbonyl groups, ether groups and combinations thereof.

17. The dispersion according to embodiments 15 or 16 wherein the fluoropolymer has an average particle size (Z-average) of from about 20 to about 500 nm.

18. The dispersion according to any one of the proceeding embodiments 15 to 17 wherein the fluoropolymer contains a core and at least one shell wherein the at least one shell has a lower molecular weight than the core.

19. The dispersion according to any one of the preceding embodiments 14 to 17 wherein the fluoropolymer has a melt flow index of less than 0.1 g/10 min at 372° C. and a load of 10 kg.

20. The dispersion according to any one of the preceding embodiments 15 to 19 wherein the fluoropolymer is a TFE copolymer, wherein the comonomer is selected from perfluorinated alkyl vinyl ether and/or perfluorinated alkyl allyl ethers, wherein the alkyl group may contain one or more oxygen atoms and contains up to 10 carbon atoms.

21. The dispersion according to any one of the preceding embodiments 15 to 20 wherein the fluoropolymer is selected from tetrafluoroethylene homopolymers or tetrafluoroethylene copolymers containing up to 1% by weight of perfluorinated comonomers.

22. The dispersion according to any one of the preceding embodiments 15 to 21 wherein the fluoropolymer has a melting point between about 312° C. and about 350° C.

23. The dispersion according to any one of the preceding embodiments being a coating composition further containing one or more of the following: a metal oxide, a metal carbide, at least one non-fluorinated polymer, or a combination thereof.

24. The dispersion according to any one of the preceding embodiments 15 to 23 containing from about 4 to about 20% weight based on the fluoropolymer content of the sugar based emulsifiers.

25. The dispersion according to any one of the preceding embodiments 15 to 24 containing from about 0.2 to about 5 weight % based on the weight of the composition of the anionic surfactant.

26. The dispersion according to embodiment 25 wherein the anionic surfactants is branched.

27. The dispersion according to any one of the preceding embodiments 25 to 26 wherein the anionic surfactant is a fatty acid sulfate, sulfonate or phosphonate.

28. The dispersion according to any one of the preceding embodiments 25 to 26 wherein the surfactant is a secondary or primary sulfate, sulfonate or phosphate.

29. A substrate containing a coating prepared from the composition according to any one of the preceding embodiments 15 to 28.

30. The substrate of embodiment 29 being selected from cookware, bearings, fibers and fabrics.

31. A method of coating a substrate comprising applying the dispersion according to any one of embodiments 14 to 27 to a substrate.

32. The method of embodiment 31 wherein the dispersion is applied by spray coating.

The invention claimed is:

1. Process for upconcentrating an aqueous dispersion of a fluoropolymer selected from the group consisting of a polytetrafluoroethylene homopolymer, a polytetrafluoroethylene copolymer, and combinations thereof; comprising
   providing the aqueous dispersion of the fluoropolymer and a fluorinated polyether emulsifier having the general formula:

[Rf—O-L-A]M with L being a fully perfluorinated or partially fluorinated alkylene group, Rf being a partially or fully fluorinated alkyl group wherein the alkyl chain is interrupted by at least one ether oxygen atom, A represents an acid residue and M represents the counterion or combination of counterions for the acid group A including a proton; and heat treating the dispersion in the presence of from about 1 to about 15% by weight based on the fluoropolymer content of that dispersion of a sugar-based emulsifier, wherein such heat treating induces phase separation into
   an aqueous fluoropolymer-enriched dispersion having
      a first amount of the fluorinated polyether emulsifier and
      a first amount of the fluoropolymer;
   wherein the first amount of the fluorinated polyether emulsifier is no greater than 500 ppm and the first amount of the fluoropolymer is at least 40% by weight, based on the total weight of the aqueous fluoropolymer-enriched dispersion, and
   an aqueous fluoropolymer-depleted phase having
      a second amount of the fluorinated polyether emulsifier and
      a second amount of the fluoropolymer, and
   further wherein
   the first amount of the fluoropolymer in the fluoropolymer-enriched phase is greater than the second amount of the fluoropolymer in the fluoropolymer-depleted phase; and
   the second amount of the fluorinated polyether emulsifier in the aqueous fluoropolymer-depleted phase is greater than the first amount of the fluorinated polyether emulsifier in the aqueous fluoropolymer-depleted phase.

2. The process according to claim 1, wherein the sugar-based emulsifier comprises a cyclic polyol unit and a linear or branched acyclic long chain unit containing from 6 to 26 carbon atoms.

3. The process according to claim 1 wherein the sugar-based emulsifier comprises a cyclic polyol unit having a six-membered ring.

4. The process according to claim 1 wherein the sugar-based emulsifier comprises an alkyl glycoside or alkenyl glycoside wherein the glycoside comprises at least one pyranose unit and at least one linear or branched acyclic alkyl or alkenyl chain having from 8 to 16 carbon atoms, wherein the chain may be interrupted by one or more than one ether oxygen atoms to form an ether or polyether residue.

5. The process according to claim 1 wherein the sugar-based emulsifier comprises a blend of different sugar-based emulsifiers comprising
   a) a first population of sugar-based emulsifiers that comprise a cyclic polyol unit and a linear or branched acyclic chain containing from 8 to 10 carbon atoms; and
   b) a second population of sugar-based emulsifiers that comprise a cyclic polyol unit and a linear or branched acyclic chain having from 10 to 16 carbon atoms.

6. The process according to claim 5 wherein the sugar-based emulsifiers of the first and second populations are selected from the group consisting of alkyl glucosides or alkenyl glucosides.

7. The process according to claim 1 wherein the heat treating comprises heating to a temperature of 50 to 80 ° C. for about one hour.

8. The process according to claim 1 wherein the fluoropolymer has a Z-average particle size of from about 20 to about 500 nm.

9. The process according to claim 1 wherein the fluoropolymer has a melt flow index of less than 0.1 g/10 min at 372° C. and a load of 10 kg.

10. The process according to claim 1 wherein the fluoropolymer is a copolymer having tetrafluoroethylene monomer and a comonomer selected from the group consisting of a perfluorinated alkyl vinyl ether and a perfluorinated alkyl allyl ether.

11. The process according to claim 1 comprising upconcentrating the dispersion of the fluoropolymer to a fluoropolymer content of at least about 45% by weight.

12. The process according to claim 1 further comprising separating the aqueous fluoropolymer-enriched dispersion from the aqueous fluoropolymer-depleted phase to obtain an upconcentrated fluoropolymer dispersion from the aqueous fluoropolymer-enriched dispersion and adding an additive selected from the group consisting of an anionic surfactant and an ester group containing coalescent agent, to the upconcentrated fluoropolymer dispersion, wherein the anionic surfactant is selected from a sulfate, a sulfonate and a phosphonate.

* * * * *

UNITED STATES PATENT AND TRADEMARK OFFICE
CERTIFICATE OF CORRECTION

| | | |
|---|---|---|
| PATENT NO. | : 10,093,820 B2 | Page 1 of 1 |
| APPLICATION NO. | : 14/891566 | |
| DATED | : October 9, 2018 | |
| INVENTOR(S) | : Tilman Zipplies | |

It is certified that error appears in the above-identified patent and that said Letters Patent is hereby corrected as shown below:

In the Specification

<u>Column 1</u>
Line 51, Delete "$CF_3-(CF_2)_6-COO^-$" and insert -- $CF_3-(CF_2)_n-COO^-$ --, therefor.

<u>Column 11</u>
Line 53, Delete "Krlss" and insert -- Krüss --, therefor.

Signed and Sealed this
Fourth Day of June, 2019

Andrei Iancu
*Director of the United States Patent and Trademark Office*